Sept. 11, 1934.  D. H. RUSSELL  1,973,269
PLATE AND PAN LIFTER
Filed April 29, 1933
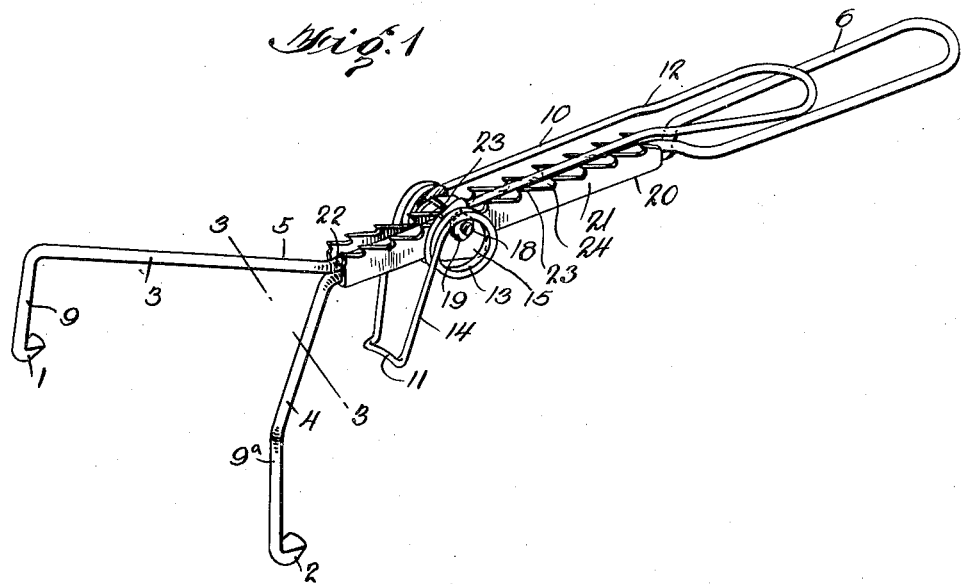
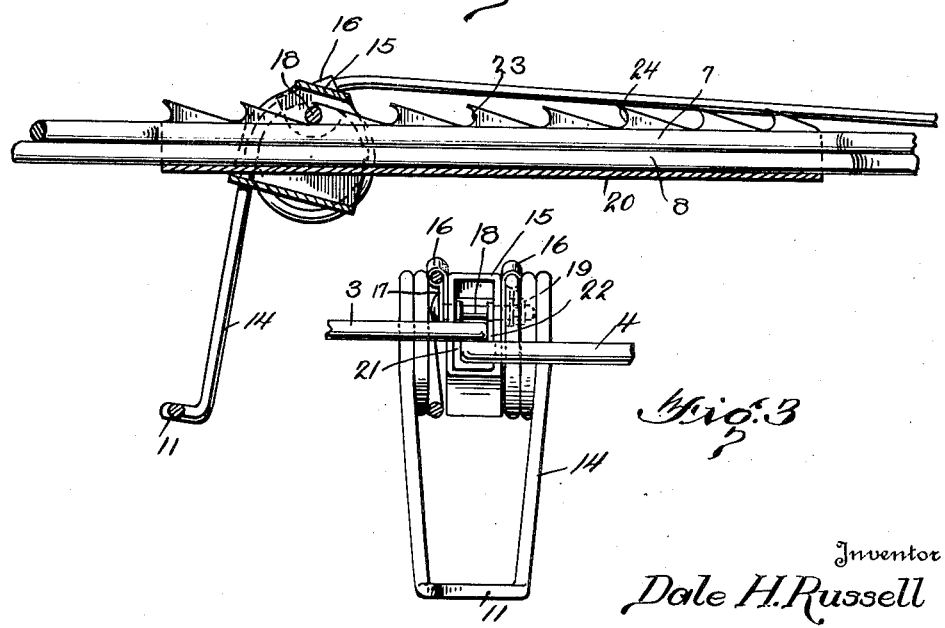
Inventor
Dale H. Russell
By C. F. Haden
Attorneys Patented Sept. 11, 1934

1,973,269

UNITED STATES PATENT OFFICE 1,973,269

PLATE AND PAN LIFTER

Dale H. Russell, Shenandoah, Iowa

Application April 29, 1933, Serial No. 668,641

5 Claims. (Cl. 294—34)

This invention relates to kitchen utensils and more particularly to plate and pan lifters.

A primary object of the invention is to so construct a lifter for cake and pie pans, pyrex and other dishes or vessels having a rim or flange whereby such pans may be quickly and easily grasped and securely held while placing them in and removing them from a hot oven without necessitating the use of a holder and without danger of burning the hands.

Another object of the invention is to construct a lifter of this character so that it may be quickly and easily adjusted to fit vessels of different sizes and when so adjusted will firmly and safely hold the article gripped avoiding all possibility of its being dropped.

Another object is to provide a device of this character which will hold the vessel gripped under spring tension avoiding all danger of breakage or injury to the vessel and which will not contact the crust of a pie or other contents of the vessel.

Still another object is to provide a pan and dish lifter constructed so that there are no sharp points or projections such as would be likely to injure either the person or clothing of the user, and which when not in use may be stored in a comparatively small space.

In carrying out these objects the invention is susceptible of modifications without departing from the spirit or sacrificing any of the advantages of the claimed invention.

In the accompanying drawing:

Figure 1 represents a perspective view of a lifter constructed in accordance with this invention;

Fig. 2 is a detail longitudinal section; and

Fig. 3 is a transverse section taken on the line 3—3 of Fig. 1.

In the embodiment illustrated the lifter constituting this invention comprises a three-point gripping device the points 1 and 2 of which are carried by diverging arms 3 and 4 of the main or primary member 5 while the point 11 is carried by the cooperating secondary member 10. The main member 5 is preferably constructed of about $\frac{3}{16}$" steel wire, and member 10 of wire several sizes lighter. Both of these members may be nickel-plated, or finished in any desired manner.

The body or main member 5 is substantially Y-shaped, the wire from which it is formed being bent midway its length to form a loop 6 of any desired length which constitutes the handle of said member. At the inner end of the loop the side members are bent inward toward each other and then arranged in superposed relation and in contact as shown in Figs. 1 and 2. These superposed members 7 and 8 are mounted in a trough-shaped rack 20 and are spot welded or otherwise rigidly connected together, and to said member 20 forming a strong weight-resisting body to support the article to be lifted. These members 7 and 8 emerge from the front end of the trough 20 and diverge forming the arms 3 and 4. These arms 3 and 4 have their outer ends bent to form depending hangers or jaws 9 and 9a which carry at their terminals the vessel rim engaging points 1 and 2 of suitable form which are designed to engage the flange or rim of the vessel to be lifted.

The trough-shaped rack member 20 carries forwardly inclined ratchet-like teeth 23 here shown formed along the edges of its side members 21 and 22. These teeth have seats 24 at their bases for a purpose to be described.

The secondary member 10 which carries the gripping point or bearing 11 embraces and is movable longitudinally on the rack 20 of member 5 and is preferably constructed of a piece of spring wire bent to form a loop-shaped handle 12 the side members of which are coiled at opposite points to form springs 13 which connect the handle 12 with the gripping jaw 14. This jaw 14 as shown is also in the form of a loop which extends laterally and in the same direction as the jaws 9 and 9a of member 5. The vessel-engaging foot 11 of jaw 14 is in the form of a connecting rod curved to conform to the shape of the pan to be lifted. This foot 11 extends laterally and forwardly and lies in a plane between that occupied by the rearwardly extending feet 1 and 2 of member 5 to cooperate with them in forming a three-point vessel gripping device.

A stirrup-like hanger 15 is connected with the side members of handle member 10 at the coils 13 by suitable means such as sleeves 16 thru which the inner spirals of these coils pass and which sleeves have apertured ears 17 for the passage of a bolt 18 which also passes thru the side members of the hanger 15 and is secured by a nut 19 to provide for the clamping of the hanger on trough 20 to hold the handle member in adjusted position until positively moved. This hanger 15, which is designed to slide on the rack member 20, has its bolt 18 extending transversely therethru above the rack teeth so that when the handle 12 is moved toward handle 6 the bolt 18 will drop into the adjacent seat of the rack and hold the member 10 in adjusted position. Any desired number of rack teeth may be provided and they may be of any desired size provided the seats in their throats be large enough to receive the bolt 18.

The coil springs 13 which connect jaw 14 with handle 12 permit sufficient yielding of jaw 14 when forced into clamping engagement with the vessel to be lifted, to avoid injury to the vessel or to the implement and yet the jaw is rigid enough to reliably hold the vessel between it and jaws 9 and 9a without danger of dropping it.

In the use of this lifter the feet 1 and 2 of jaws 9 and 9a are slipped over the rim of the pan to be lifted and then the handle member 10 is slid forward with the bolt 18 riding over the teeth 23, handle 12 being raised during this operation. When jaw 14 reaches the pan and foot 11 contacts the side wall thereof the bolt 18 drops into the adjacent seat 24 and the handle 12 is swung down causing foot 11 to move forward and clamp the pan resiliently between it and feet 1 and 2. The handles 12 and 6 then assume the position shown in Fig. 1, one superposed on the other so that they may be conveniently grasped by the user's hand. The pan is then lifted into the oven without inserting the hand and is released by lifting or raising handle 12 slightly. The implement is then raised sufficiently to clear the pan rim and may be withdrawn from the oven. To remove the pan from the oven the operation is obvious, the implement being inserted in the oven above the pan until the jaws are in the proper position to engage its rim, handle 12 being slightly open. Then the handle 12 is closed and the pan firmly gripped between feet 1, 2 and 11 and in this position the pan may be easily withdrawn and lifted from the oven and carried to any desired place.

It will be seen that this lifter has two points of adjustment to accommodate vessels of different sizes, the rack teeth adjustment and the swinging jaw 14. The two jaws or prongs 9 and 9a will move into place by a slight pull on the handle 6.

I claim as my invention:

1. In an implement of the class described the combination of a primary member and a secondary member, the secondary member having a sleeve embracing and movable lengthwise of the primary member, the primary member having at one end two laterally spaced gripping elements, a handle at its opposite end and spaced teeth between its ends; the secondary member having a handle at one end, a gripping element at the other end and a tooth-engaging fulcrum element between the ends whereby the secondary member may be adjusted lengthwise of the primary member to bring its tooth-engaging fulcrum element into co-operation with a selected tooth on the primary member and the secondary member may be swung about its tooth-engaging fulcrum element when the handles of both members are grasped simultaneously and pressed towards each other.

2. In an implement of the class described the combination of a primary member and a secondary member, the secondary member having a sleeve embracing and movable lengthwise of the primary member, the primary member having at one end two resilient spaced downturned gripping elements, a handle at its opposite end and longitudinally spaced ratchet teeth between the ends, the secondary member having a handle at one end, a resilient downturned gripping member at the other end, and a tooth-engaging fulcrum element between the ends whereby the secondary element may be slidably adjusted to engage by the fulcrum element the tooth desired to resiliently grip objects of different sizes when the handles of the two members are grasped and pressed towards each other.

3. In a pan lifting device the combination of a primary member having a handle at one end, a gripping device at the other end, and teeth between the ends; a complementary member of resilient material mounted adjustably upon the primary member and having a handle at one end, a gripping device at the opposite end, a coiled spring between the ends and connected to both, a U-shaped resilient fulcrum-carrying element carried by the spring and engaging the primary element, a bolt passing thru the arms of the fulcrum-carrying element and serving as a fulcrum to engage the teeth and to regulate frictional contact of the primary element with the fulcrum-carrying element, being so constructed and assembled as to be adjustable to accommodate different sized pans and resiliently grip and hold pans when the two handles are pressed towards each other.

4. A pan lifter comprising a member having spaced resilient pan-engaging devices at one end, a handle at the other end and teeth between the ends; a complementary member having a resilient pan-engaging device at one end, a handle at the other end, and a tooth-engaging fulcrum device between the ends slidable upon the first named member whereby the tooth-engaging fulcrum device may be brought into engagement with different teeth to adjust the pan lifter to accommodate different sizes of pans and whereby the complementary member may be swung about the fulcrum device to and from the first named member to grip the pan.

5. In a pan lifting device the combination of a primary member having a handle at one end, a gripping device at the other end, and teeth between the ends; a complementary member of resilient material mounted adjustably upon the primary member and having a handle at one end, a gripping device at the opposite end, a spring between the ends and connected to both, a fulcrum carrying element carried by the spring and engaging the primary element, the fulcrum operating to engage the teeth and to regulate frictional contact of the primary element with the fulcrum carrying element, the parts being so constructed and assembled as to be adjustable to accommodate differents sized pans and resiliently grip and hold pans when the two handles are pressed towards each other.

DALE H. RUSSELL.